United States Patent [19]
Nogami et al.

[11] Patent Number: 5,700,391
[45] Date of Patent: Dec. 23, 1997

[54] LIQUID COATING COMPOSITION FORMING A LIQUID CRYSTAL DISPLAY ELEMENT INSULATING FILM

[75] Inventors: Tatsuya Nogami; Rie Sakai; Takeshi Hosoya, all of Funabashi, Japan

[73] Assignee: Nissan Chemical Industries, Ltd., Tokyo, Japan

[21] Appl. No.: 196,444

[22] Filed: Feb. 15, 1994

[30] Foreign Application Priority Data

Feb. 18, 1993 [JP] Japan .................. 5-029213

[51] Int. Cl.$^6$ ............... C09K 19/52; C09K 19/00
[52] U.S. Cl. ......................... 252/299.01; 428/1
[58] Field of Search ............ 252/299.01, 299.4; 428/1

[56] References Cited

U.S. PATENT DOCUMENTS

| 4,308,371 | 12/1981 | Tanaka et al. ............ 528/18 |
| 4,510,283 | 4/1985 | Takeda et al. ............ 524/356 |
| 4,868,096 | 9/1989 | Nakayama et al. ........ 430/329 |
| 4,894,254 | 1/1990 | Nakayama et al. ........ 427/38 |
| 5,091,009 | 2/1992 | Nogami et al. ............ 106/287.1 |
| 5,133,895 | 7/1992 | Ogawa et al. ............. 252/299.4 |
| 5,177,157 | 1/1993 | Akamatsu .................. 525/398 |

FOREIGN PATENT DOCUMENTS

| 2-48403 | 2/1990 | Japan . |
| 2-258646 | 10/1990 | Japan . |
| 3-263476 | 11/1991 | Japan . |
| 4-247427 | 9/1992 | Japan . |

*Primary Examiner*—C. H. Kelly
*Attorney, Agent, or Firm*—Oliff & Berridge

[57] ABSTRACT

Disclosed is a liquid coating composition for forming a liquid crystal display element insulating film, which comprises a solution to be obtained by hydrolysis of $Si(OR)_4$ in the presence of an alkaline catalyst a hydrolyzed product of $R^1{}_nSi(OR^2)_{4-n}$ and/or $Ti(OR^3)_4$, an aluminium salt and a deposition inhibitor, all having been uniformly mixed in an organic solvent. R, $R^2$ and $R^3$ each are a $C_1$ to $C_5$ alkyl group. $R^1$ is an alkyl, alkenyl or aryl group, and n is 0 to 2. Though containing a trialkoxysilane having a high repelling property, the liquid coating composition may form an insulating film having high mechanical strength on a substrate and the coatability of a polyimide solution over the film is good. The adhesiveness of the oriented polyimide film to the insulating film is good. The insulating film has a high insulation property and has no bad influence on the display performance of liquid crystal display elements.

13 Claims, 1 Drawing Sheet

LIQUID COATING COMPOSITION FORMING A LIQUID CRYSTAL DISPLAY ELEMENT INSULATING FILM

FIELD OF THE INVENTION

The present invention relates to a protective insulating film for a transparent conductive film of a liquid crystal display element. More particularly, it relates to a liquid coating composition which is applied to a transparent conductive film of a liquid crystal display element and hardened by heat to form a coating with excellent insulation property and surface hardness, for a more reliable liquid crystal display element and an improvement in the production yield thereof.

DESCRIPTION OF THE PRIOR ART

The increasing size of liquid crystal display elements has been accompanied by the formation of oxide films for the purpose of insulation and protection of transparent electrodes. Known methods for the formation of these oxide films are gas-phase methods such as the vaporization method, the spattering method, etc. and coating methods which employ liquid coating compositions for the formation of oxide films, the latter being most widely used in the light of productivity and ease of formation of films on large-sized substrates. The liquid coating compositions used are hydrolyzed products of tetraalkoxysilanes, and their complexes with other metal alkoxides or metal chelates.

The formation of insulating films by coating methods is preferably done through thermal hardening at temperatures of 300° C. or lower, to avoid such problems as variations in resistance of transparent conductive films, energy loss, glass deformation, etc.

Where a hydrolyzed product of a tetraalkoxysilane is used as the liquid coating composition, needed is heating at temperatures of 450° C. or higher so as to form a coating having a sufficient hardness. For the purpose of evading the disadvantage, use of acetylacetonato compounds has been proposed (Japanese Patent Laid-Open No. 2-48403). However, acetylacetonato compounds releases their ligand of acetylacetone which frequently remained in the coating formed to worsen the insulating property of the coating. When the coating was used as the insulating film for liquid crystal display elements, there occurred another problem to worsen the coatability of a polyimide or polyamic acid solution (hereinafter referred to as a "polyimide solution") to be coated over the coating to form a film to be oriented. Japanese Patent Laid-Open No. 2-258646 has proposed a coating composition containing an aluminium salt, and they say that, when baked at low temperatures, the composition yields a hardened coating having a high hardness and a good insulation property and that the coatability of a polyimide solution over the coating is good. However, this was also problematic in that the adhesiveness of the coating to the oriented polyimide film that had been formed over the coating was not sufficient and the oriented polyimide film peeled off from the coating during the step of rubbing the film.

The adhesiveness of the oriented polyimide film to an inorganic material such as glass is not by chemical bond therebetween but is mostly by the physical effect, or a so-called anchor effect of the film to the rough surface of the substrate coated therewith. When the above-mentioned known liquid coating composition is coated on the surface of a transparent conductive film substrate, the fine hollows that are originally on the surface of the transparent conductive film substrate are filled with the coated components whereby the coated film substrate is made smooth. As a result, the adhesiveness of the oriented polyimide film, that has been formed on the substrate via the coating, to the substrate is lowered.

For the purpose of forming a coating having fine hollows on its surface so as to increase the adhesiveness of the coating to the material to be coated thereover, a liquid coating composition comprised of a silica sol to be obtained by hydrolysis of an alkoxysilane and an alkoxysilane has been proposed. However, the proposed technique was still problematic in that the coatability of a polyimide solution over the coating formed from the composition was poor and the polyimide solution applied to the coating was repelled by the coating (Japanese Patent Laid-Open No. 3-263476). On the other hand, a liquid coating composition comprised of an acetylacetonato compound and fine particles of an inorganic compound has been proposed (Japanese Patent Laid-Open No. 4-247427) to improve the adhesiveness of the coating from the composition to an oriented polyimide film. However, the coatability of a polyimide solution over the coating was still poor. In addition, the insulating property of the coating formed was not good due to the acetylacetone remained in the coating. Hence, the coating formed from the proposed composition was not satisfactory.

SUMMARY OF THE INVENTION

The present invention is to provide a liquid coating composition for the formation of insulating films which possess excellent insulation property and surface hardness and which, when applied to a substrate and hardened thereon by low-temperature baking, are useful as insulating films for liquid crystal display elements, the insulating films being characterized in that the coatability of a polyimide solution over them is good and the adhesiveness of the oriented polyimide film resulting from the coating of the solution thereover to them is good.

The liquid coating composition for use in the formation of insulating films for liquid crystal display elements according to the present invention is characterized by comprising a solution to be obtained by hydrolyzing a tetraalkoxysilane of the general formula (1):

$$Si(OR)_4 \qquad (1)$$

wherein R represents an alkyl group having from 1 to 5 carbon atoms, in an organic solvent in the presence of an alkaline catalyst; a hydrolyzed product of an alkoxysilane of the general formula (2):

$$R^1{}_n Si(OR^2)_{4-n} \qquad (2)$$

wherein $R^1$ represents an alkyl group, an alkenyl group or an aryl group, $R^2$ represents an alkyl group having from 1 to 5 carbon atoms, and n represents an integer of from 0 to 2, and/or a tetraalkoxy titanium of the general formula (3):

$$Ti(OR^3)_4 \qquad (3)$$

wherein $R^3$ represents an alkyl group having from 1 to 5 carbon atoms; and an aluminium salt and a deposition inhibitor, all having been uniformly mixed in an organic solvent.

DETAILED DESCRIPTION OF THE INVENTION

Figure 1:
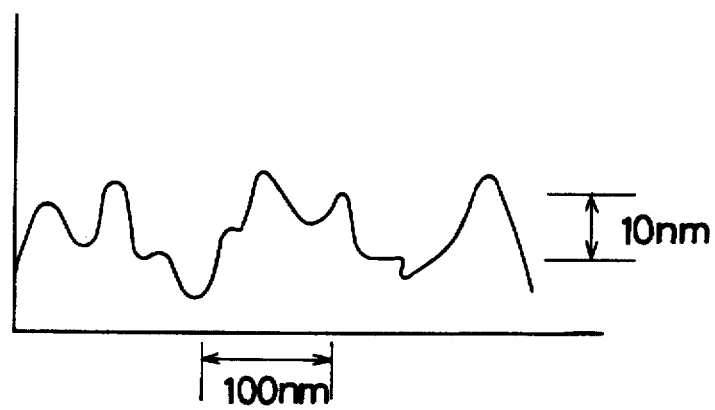
FIG. 1 shows the surface roughness of the film formed from the composition of Example 1.

The tetraalkoxysilane available for use in the present invention is represented by the general formula (1), wherein R represents an alkyl group having from 1 to 5 carbon atoms, preferably a methyl group or ethyl group.

Also, the alkoxysilane is represented by the general formula (2), wherein $R^1$ represents a methyl group, ethyl group, propyl group, butyl group, pentyl group, hexyl group, heptyl group, octyl group, stearyl group, vinyl group, 3-chloropropyl group, 3-hydroxypropyl group, 3-glycidoxypropyl group, 3-aminopropyl group, 3-methacryloxypropyl group, phenyl group, etc. Also, $R^2$ represents an alkyl group having from 1 to 5 carbon atoms, preferably a methyl group or ethyl group. n represents an integer of 0, 1 or 2.

The tetraalkoxy titanium available for use in the present invention is represented by the general formula (3), wherein $R^3$ represents an alkyl group having from 1 to 5 carbon atoms, preferably an ethyl group, propyl group or butyl group.

The aluminium salt to be used in the present invention is to improve the hardness of the film to be formed from the composition by hardening it at low temperatures and also to improve the coatability of a polyimide solution to be applied to the hardened film. Examples of such an aluminium salt include aluminium chloride, aluminium nitrate, aluminium sulfate, aluminium sulfamate, aluminium acetate, aluminium oxalate, and their basic acids.

The above-mentioned aluminium salt is used at a molar ratio of around 0.05 to 1.0 times the sum of the moles of the above-mentioned alkoxide compounds of formulae (1), (2) and (3).

The deposition inhibitor to be used in the present invention is to prevent crystallization of said aluminium salt on the surface of the film during drying of the coated film. The deposition inhibitor may be one or more of the following: ethylene glycol, N-methylpyrrolidone, dimethylformamide, dimethylacetamide and their derivatives, and is used in an amount of at least equal weight proportion to the aluminium salt in terms of $Al_2O_3$.

The hydrolyzed solution of the tetraalkoxysilane of formula (1) to be contained in the liquid coating composition of the present invention is obtainable by hydrolyzing the tetraalkoxysilane in an organic solvent in the presence of an alkaline catalyst.

The hydrolysis of the tetraalkoxysilane of formula (1) is effected using water at a mole of from 3 to 20 times the mole of the tetraalkoxysilane. The alkali to be used as the catalyst is not specifically defined, provided that it is basic, including, for example, sodium hydroxide, potassium hydroxide, ammonia, alkylamines, etc. Considering that the liquid coating composition of the present invention is used in producing liquid crystal display elements, ammonia and amines such as alkylamines are preferred. The alkali catalyst is employed in an amount of from 1 to 20 mol %, relative to the tetraalkoxysilane.

The hydrolysis is effected under such a condition that the concentration of the tetraalkoxysilane in the reaction system is from 1 to 8% by weight, in terms of $SiO_2$. After the reaction, if desired, the hydrolyzed solution may be concentrated with no problem.

Examples of the organic solvent to be used for the hydrolysis include one or a mixture of two or more of any of the following: alcohols such as methanol, ethanol, propanol, butanol, etc; ketones such as acetone, methyl ethyl ketone, etc.; aromatic hydrocarbons such as benzene, toluene, xylene, etc.; glycols such as ethylene glycol, propylene glycol, hexylene glycol, etc.; glycol ethers such as ethyl cellosolve, butyl cellosolve, ethyl carbitol, butyl carbitol, diethyl cellosolve, diethyl carbitol, etc.; N-methylpyrrolidone, dimethylformamide, etc. Considering the solubility of water and tetraalkoxysilanes in the solvent, preferred are alcohols, glycols and their derivatives, N-methylpyrrolidone, etc. After the reaction, if desired, the solvent used for the reaction may be substituted by any of the above-mentioned solvent with no problem.

The addition of water for the hydrolysis is generally done at room temperature, but it may also be done while heating, as required.

The hydrolyzed solution to be obtained by hydrolyzing the tetraalkoxysilane of formula (1) in an organic solvent in the presence of an alkaline catalyst, which is to be in the liquid coating composition of the present invention, forms silica particles as the hydrolyzed product, and it is desired that the silica particles to be formed have a particle size falling within the range of from 10 to 80 nm when measured by a dynamic light-scattering method.

The hydrolyzed product of the alkoxysilane of formula (2), which is to be in the liquid coating composition of the present invention, is obtained by hydrolyzing said alkoxysilane in an organic solvent in the presence of an acid catalyst and also an aluminium salt. The hydrolysis of the alkoxysilane is effected using water at a mole of from 0.5 to 2.5 times the mole of all the alkoxide groups of the alkoxysilane. When said aluminium salt is a hydrated salt, that amount of water in the salt is included in the measurement of the amount of water to be used in the hydrolysis.

As described above, the mixing of the aluminium salt and the hydrolyzed product of the alkoxysilane may be done either at the time of the hydrolysis of the alkoxysilane or after the completion thereof.

Examples of the organic solvent which may be used for the hydrolysis include one or a mixture of two or more of any of the following: alcohols such as methanol, ethanol, propanol, butanol, etc; ketones such as acetone, methyl ethyl ketone, etc.; aromatic hydrocarbons such as benzene, toluene, xylene, etc.; glycols such as ethylene glycol, propylene glycol, hexylene glycol, etc.; glycol ethers such as ethyl cellosolve, butyl cellosolve, ethyl carbitol, butyl carbitol, diethyl cellosolve, diethyl carbitol, etc.; N-methylpyrrolidone, dimethylformamide, etc. Considering the method for coating the composition by transfer printing, spin coating or the like, preferred are glycols and glycol ethers having a boiling point of 120° C. or higher.

The hydrolysis is generally effected at room temperature, but is may also be effected under heat, if desired.

It is preferred that the liquid coating composition of the present invention contains the hydrolyzed solution of the alkoxysilane of formula (2) in an amount of from 1 to 15% by weight as the solid content of $SiO_2+Al_2O_3$, when the alkoxysilane is calculated in terms of $SiO_2$ and the aluminium salt in terms of $Al_2O_3$.

The tetraalkoxy titanium of formula (3) to be employed in the present invention may be added to the alkoxysilane of formula (2) during its hydrolysis. Apart from this, however, addition of the hydrolyzed solution of the alkoxysilane of formula (2) to a solution of the tetraalkoxy titanium in an organic solvent is preferred to obtain a liquid coating composition having excellent storage stability. The hydrolyzed solution of the alkoxysilane of formula (2) may contain the hydrolyzed solution of the tetraalkoxysilane of formula (1) formed in the presence of an alkaline catalyst, with no problem.

Needless-to-say, the hydrolyzed solution of the tetraalkoxysilane of formula (1) may well be added to the mixture of the hydrolyzed solution of the alkoxysilane of formula (2) and the solution of the tetraalkoxy titanium in an organic solvent. In the absence of the alkoxysilane component of formula (2), as the case may be, a solution of the mixture comprising water, an aluminium salt and a deposition inhibitor is first added to the solution of the tetraalkoxy titanium in an organic solvent and then the hydrolyzed solution of the tetraalkoxysilane of formula (1) is added thereto. For the purpose of further improving the storage stability of the liquid coating composition of the present invention, containing the tetraalkoxy titanium of formula (3), it is preferred that the tetraalkoxy titanium is first subjected to partial inter-esterification with a glycol such as ethylene glycol, propylene glycol, hexylene glycol or the like and then mixed with the hydrolyzed solutions of alkoxysilanes by the above-mentioned methods.

The liquid coating composition of the present invention is obtained by the mixing mentioned above. After the mixing, if desired, the composition may be heated at temperatures falling within the range of from 50° C. to 150° C. for aging the composition. In addition for the purpose of elevating the boiling point of the liquid coating composition and of increasing the viscosity thereof, the alcohols having a low boiling point, that are produced as side products after the mixing, may be removed by distillation.

The molar proportions of the tetraalkoxysilane component of formula (1), the alkoxysilane component of formula (2), the tetraalkoxy titanium component of formula (3) and the aluminium salt component (Al) to be contained in the liquid coating composition of the present invention are such that $(1)/[(1)+(2)+(3)+(Al)]$ is from 0.05 to 0.9, that $(2)/[(1)+(2)+(3)+(Al)]$ is from 0 to 0.95 and that $(3)/[(1)+(2)+(3)+(Al)]$ is from 0 to 0.95.

It is preferred that the solid content in the liquid coating composition of the present invention falls within the range of from 1 to 15% by weight, in terms of $SiO_2+TiO_2+Al_2O_3$, when the sum of the alkoxysilanes of formula (1) and (2) is calculated in terms of $SiO_2$, the aluminium salt in terms of $Al_2O_3$ and the tetraalkoxy titanium of formula (3) in terms of $TiO_2$.

The liquid coating composition for the formation of a liquid crystal display element insulating film, according to the present invention, may be coated on a substrate by known coating methods, including, for example, a dipping method, a spin coating method, a transfer printing method, a brush coating method, a roll coating method, a spraying method, etc. After the coated composition has been dried, it is heated at temperatures of 100° C., or higher to give a hardened film having a good insulation property and a high hardness. The coatability of a polyimide solution over the hardened film is good and the adhesiveness of the oriented polyimide film coated thereover is also good.

It is preferred that the hydrolyzed solution of the tetraalkoxysilane to be formed in the presence of an alkaline catalyst, which is used in the present invention, contains particles having a particle size of from 10 to 80 nm as measured by a dynamic light-scattering method. If the particles in the solution has a particle size smaller than 10 nm, the surface roughness of the hardened film to be obtained from the liquid coating composition containing the solution is insufficient, when the film is desired to be used as an insulating film for liquid crystal display elements, so that the adhesiveness of the film to the oriented polyimide film to be formed thereover is not sufficient. On the other hand, if the particle size is larger than 80 nm, the adhesiveness of the film to the oriented polyimide film is not increased so much but the uniformity of the hardened film is lowered. In addition, when the impurities are removed from the liquid coating composition by filtration, such large particles unfavorably cause the clogging of the filter being used.

In the hydrolysis of the tetraalkoxysilane in the presence of an alkaline catalyst, if water is used in an amount less than 3 moles, relative to mole of the tetraalkoxysilane, the hydrolyzed solution cannot contain a product having a form of particles. On the other hand, however, if the amount of water used in the hydrolysis is more than 20 mols, relative to the same, it becomes difficult to suitably control the shape of the particles to be formed and additionally the reaction is often uneven.

In the same hydrolysis, if the amount of the alkaline catalyst to be used is less than 1 mol %, relative to the tetraalkoxysilane used, not only the particle size of the particles to be formed is too small but also the stability of the hydrolyzed solution is lowered to unfavorably cause gelling of the solution. On the other hand, if it is more than 20 mol %, the particle size of the particles to be formed is too large and the particles are not uniform, unfavorably causing precipitation of the particle components.

In the same hydrolysis, if the concentration of the tetraalkoxysilane to be hydrolyzed in the presence of an alkaline catalyst is less than 1% by weight, in terms of $SiO_2$, the speed of the growth of the particles being formed is uneconomically slow and, in addition, the particle size of the particles formed is too small. On the other hand, if it is more than 8% by weight, it becomes difficult to suitably control the shape of the particles to be formed and additionally a gelled product is formed partially. Using a liquid coating composition containing such a hydrolyzed solution, it is difficult to form a uniform, hardened film.

In the hydrolysis of the alkoxysilane of formula (2) and/or the tetraalkoxy titanium of formula (3), if the amount of water to be used is less than 0.5 molar times, relative to the sum of the alkoxy groups in the alkoxide compounds, the hydrolysis cannot be completed sufficiently so that large amounts of non-reacted alkoxide compound monomers remain in the hydrolyzed product. The filming property of a liquid coating composition containing the hydrolyzed product is poor and, in addition, the mechanical property of the hardened film formed from the composition is not improved. On the contrary, if it is more than 2.5 molar times, the storage stability of the liquid coating composition containing the hydrolyzed product is poor, causing the increase in the viscosity of the liquid coating composition and the gelling of the same.

If the amount of the aluminium salt to be in the liquid coating composition of the present invention is less than 0.05 times the mole of the sum of the alkoxide compounds of formulae (1), (2) and (3), the mechanical strength of the hardened film from the composition, when hardened at low temperatures of 300° C. or lower, is poor and, in addition, the coatability of a polyimide solution to be coated over the hardened film is also poor. On the other hand, even if it is more than 1.0 times the same, not only the mechanical strength of the hardened film and the coatability of the polyimide film to be oriented thereon are not improved further more but also the chemical resistance of the hardened film is lowered.

If the amount of the deposition inhibitor to be in the liquid coating composition of the present invention is less than one time the weight of the aluminium salt therein, as calculated in terms of $Al_2O_3$, its effect for preventing deposition of crystals of the aluminium salt in the dried film is poor, causing crystallization of the aluminium salt in the film. As a result, the formed film becomes cloudy, and a uniform hardened film cannot be obtained therefrom.

Regarding the molar proportion of the tetraalkoxysilane of formula (1) to the sum of the alkoxide compounds of formulae (1), (2) and (3) and the aluminium salt (Al) to be in the liquid coating composition of the present invention, if $(1)/[(1)+(2)+(3)+(Al)]$ is less than 0.05, the adhesiveness of the coated film to the oriented polyimide film to be coated thereover is poor. On the contrary, if it is more than 0.9, the mechanical strength of the hardened film from the composition is lowered and, in addition, the chemical resistance thereof is also lowered. The addition of the alkoxysilane of formula (2) and the tetraalkoxy titanium of formula (3) to the composition of the present invention results in the improvement in the mechanical strength, the chemical resistance and the insulation property of the hardened film to be formed from the composition. In particular, the addition of the tetraalkoxy titanium results in the increase in the refractive index and the dielectric constant of the hardened film to be obtained, in accordance with the use of the film. On the other hand, if the molar ratio of $(2)/[(1)+(2)+(3)+(Al)]$ and that of $(3)/[(1)+(2)+(3)+(Al)]$ are more than 0.95, the adhesiveness of the hardened film from the composition to the oriented polyimide film to be coated thereover is lowered.

If the solid content in the liquid coating composition of the present invention is less than 1% by weight, in terms of $SiO_2 + TiO_2 + Al_2O_3$, when the sum of the alkoxysilanes of formula (1) and (2) is calculated in terms of $SiO_2$, the aluminium salt in terms of $A_2O_3$ and the tetraalkoxy titanium of formula (3) in terms of $TiO_2$, the thickness of the film to be formed by one coating of the composition is too small so that plural coatings are needed in order to obtain the predetermined thickness of the film but are inefficient. On the other hand, if it is more than 15% by weight, the thickness of the film to be formed by one coating of the composition is too large to obtain a uniform film with ease. In addition, in this case, the storage stability of the liquid coating composition is poor, causing the increase in the viscosity of the composition and the gelling of the same.

The present invention will be explained in more detail by way of the following examples, which, however, are not intended to restrict the scope of the present invention.

Production of Liquid Coating Composition

EXAMPLE 1

(a) A solution was prepared by mixing 20.8 g of tetraethoxysilane, as the tetraalkoxysilane, and 50 g of ethanol. 5.4 g of water, 0.6 g of 28% aqueous ammonia, as the alkaline catalyst, and 23.2 g of ethanol were added thereto and dissolved. The resulting solution was stirred at room temperature. After about 30 minutes, the solution became to color in a colloidal color, from which the formation of particles as the product was confirmed. This was stirred for additional 24 hours still at room temperature, to obtain a solution of a product formed by the hydrolysis with the alkaline catalyst. The solution has a solid content of 6% by weight, and this is hereinafter referred to as Solution (A).

The particle size of the particles formed was 20 nm, as measured by a dynamic light-scattering method (the same shall apply hereunder to the measurement of the particle size of particles formed, unless otherwise specifically indicated).

(b) 8.6 g of tetraethoxysilane and 7.3 g of methyltriethoxysilane, as the alkoxysilanes, were dissolved in 40 g of hexylene glycol and mixed. To this was added a solution that had been prepared by dissolving 7.7 g of aluminium nitrate 9-hydrate, 4.4 g of water and, as the deposition inhibitor, 10 g of ethylene glycol in 22 g of hexylene glycol, while stirring at room temperature. This was uniformly mixed to cause the hydrolysis of the alkoxysilanes. Thus, a hydrolyzed solution having a solid content of 6% by weight was obtained. This is hereinafter referred to as Solution (B).

A liquid coating composition was prepared by mixing 50 g of Solution (A) and 50 g of Solution (B) at room temperature, having a solid content of 6% by weight.

EXAMPLE 2

(c) A hydrolyzed solution having a solid content of 6% by weight was prepared in the same manner as in Example 1(a), using the same alkaline catalyst, except that the amount of water to be added was changed from 5.4 g to 9.0 g. This is hereinafter referred to as Solution (C). The particle size of the particles formed was 30 nm.

A liquid coating composition was prepared by mixing 50 g of Solution (C) and 50 g of Solution (B) of Example 1 at room temperature, having a solid content of 6 by weight.

EXAMPLE 3

(d) A hydrolyzed solution having a solid content of 6% by weight was prepared in the same manner as in Example 1(a), using the same alkaline catalyst, except that the amount of water to be added was changed to 9.0 g. This is hereinafter referred to as Solution (D). The particle size of the particles formed was 50 nm.

A liquid coating composition was prepared by mixing 50 g of Solution (D) and 50 g of Solution (B) of Example 1 at room temperature, having a solid content of 6 % by weight.

EXAMPLE 4

(e) A hydrolyzed solution having a solid content of 6% by weight was prepared in the same manner as in Example 1(b), except that only tetraethoxysilane was used as the alkoxysilane. This is hereinafter referred to as Solution (E).

A liquid coating composition was prepared by mixing 50 g Solution (A) of Example 1 and 50 g of Solution (E) at room temperature, having a solid content of 6% by weight.

EXAMPLE 5

(f) A hydrolyzed solution having a solid content of 6% by weight was prepared in the same manner as in Example 1(b), except that only methyltriethoxysilane was used as the alkoxysilane. This is hereinafter referred to as Solution (F).

A liquid coating composition was prepared by mixing 50 g Solution (A) of Example 1 and 50 g of Solution (F) at room temperature, having a solid content of 6% by weight.

EXAMPLE 6

(g) A hydrolyzed solution having a solid content of 6% by weight was prepared in the same manner as in Example 1(a), except that 23.6 g of tetrabutoxysilane were used as the tetraalkoxysilane. This is hereinafter referred to as Solution (G). The particle size of the particles formed was 40 nm.

(h) A hydrolyzed solution having a solid content of 6% by weight was prepared in the same manner as in Example 1(b), except that 9.7 g of tetrabutoxysilane and 5.6 g of methyltrimethoxysilane were used as the alkoxysilanes. This is hereinafter referred to as Solution (H).

A liquid coating composition was prepared by mixing 50 g Solution (G) and 50 g of Solution (H) at room temperature, having a solid content of 6% by weight.

EXAMPLE 7

(i) A hydrolyzed solution having a solid content of 6% by weight was prepared in the same manner as in Example 1(b), except that 6.3 g of tetramethoxysilane and 5.6 g of methyltrimethoxysilane were used as the alkoxysilanes. This is hereinafter referred to as Solution (I).

A liquid coating composition was prepared by mixing 50 g Solution (A) of Example 1 and 50 g of Solution (I) at room temperature, having a solid content of 6% by weight.

EXAMPLE 8

(j) In the same manner as in Example 1(b), 13.3 g of tetraethoxysilane as the alkoxysilane were dissolved and mixed in 30 g of hexylene glycol. To this was added a solution prepared by dissolving 16 g of aluminium nitrate 9-hydrate, 3.4 g of water and, as the deposition inhibitor, 10 g of ethylene glycol in 17.4 g of hexylene glycol, with stirring at room temperature. This was uniformly mixed, causing the hydrolysis of the alkoxysilane to obtain a hydrolyzed solution having a solid content of 6% by weight. This, is hereinafter referred to as Solution (J).

A liquid coating composition was prepared by mixing 50 g Solution (A) of Example 1 and 50 g of Solution (J) at room temperature, having a solid content of 6% by weight.

EXAMPLE 9

20 g of Solution (A) of Example 1 and 80 g of Solution (B) of the same were mixed at room temperature to obtain a liquid coating composition having a solid content of 6% by weight.

EXAMPLE 10

80 g of Solution (A) of Example 1 and 20 g of Solution (J) of Example 8 were mixed at room temperature to obtain a liquid coating composition having a solid content of 6% by weight.

EXAMPLE 11

(k) 46.1 g of propylene glycol were added to 50 g of Solution (A) of Example 1, and ethanol was removed therefrom by distillation under reduced pressure at 60° C. to cause the solvent substitution. Thus, a dispersion of silica particles having a particle size of 25 mm was obtained, and this had a solid content of 6% by weight. This is hereinafter referred to as Solution (K).

50 g of Solution (K) and 50 g of Solution (B) of Example 1 were mixed at room temperature to obtain a liquid coating composition having a solid content of 6% by weight.

EXAMPLE 12

(l) 12.4 g of tetraisopropoxy titanium were mixed with 25 g of propylene glycol, while stirring. The temperature of the mixture rose from 25° C. to 40° C., whereupon crystals of the titanium compound precipitated out to give a slurry.

3.0 g of tetraethoxysilane and 2.6 g of methyltriethoxysilane were dissolved in 30 g of butyl cellosolve and mixed. To the resulting solution, added was a solution that had been prepared by dissolving 1.3 g of water, 5.6 g of aluminium nitrate 9-hydrate and, as the deposition inhibitor, 10 g of N-methylpyrrolidone in 10.1 g of hexylene glycol, while stirring at room temperature. The thus-formed solution was added to the above-mentioned tetraisopropoxy titanium/propylene glycol slurry, while stirring at room temperature. After the mixing, the precipitates dissolved in the solution, which became a transparent pale-yellow solution. Thus, a titanium-containing hydrolyzed solution was obtained, having a solid content of 6% by weight. This is hereinafter referred to as Solution (L).

30 g of Solution (A) of Example 1 and 70 g of Solution (L) were mixed at room temperature to obtain a liquid coating composition having a solid content of 6% by weight.

Comparative Example 1

8.6 g of tetraethoxysilane and 7.3 g of methyltriethoxysilane as the alkoxysilanes were dissolved and mixed in 40 g of hexylene glycol. To the resulting solution, added was a solution that had been prepared by dissolving 7.7 g of aluminium nitrate 9-hydrate, 4.4 g of water and, as the deposition inhibitor, 10 g of ethylene glycol in 22 g of hexylene glycol, while stirring at room temperature, and mixed uniformly. After thus hydrolyzed, a liquid coating composition having a solid content of 6% by weight was obtained.

Comparative Example 2

8.6 g of tetraethoxysilane as the alkoxysilane were dissolved and mixed in 20 g of hexylene glycol. This, added was a solution that had been prepared by dissolving 1.0 g of nitric acid as the acid catalyst, 2.2 g of water and 5 g of ethylene glycol in 15 g of hexylene glycol, while stirring at room temperature, and mixed uniformly. After thus hydrolyzed, a hydrolyzed solution having a solid content of 6% by weight was obtained. To this, added were 50 g of Solution (A) of Example 1 to obtain a liquid coating composition having a solid content of 6% by weight.

Comparative Example 3

4.3 g of tetraethoxysilane and 3.6 g of methyltriethoxysilane as the alkoxysilanes were dissolved and mixed in 20.7 g of hexylene glycol. To this, added was a solution that had been prepared by dissolving 1.0 g of nitric acid as the acid catalyst, 2.2 g of water and 5 g of ethylene glycol in 15 g of hexylene glycol, while stirring at room temperature, and mixed uniformly. After thus hydrolyzed, a hydrolyzed solution having a solid content of 6% by weight was obtained. To this, added were 50 g of Solution (A) of Example 1 to obtain a liquid coating composition having a solid content of 6% by weight.

Comparative Example 4

Production of Acetylacetonato-titanium 28.4 g of tetraisopropoxy titanium were dissolved in 30 g of isopropanol, and a solution that had been prepared by dissolving 22 g of acetylacetone in 19.6 g of isopropanol was dropwise added thereto at room temperature, to obtain an acetylacetonato-titanium solution. This had a solid content of 6% by weight, in terms of $TiO_2$.

Production of Liquid Coating Composition 100 g of the tetraethoxysilane-hydrolyzed solution having a solid content of 6% by weight, obtained in Comparative Example 2, were added to 100 g of the acetylacetonato-titanium solution mentioned above, to obtain a titanium-containing hydrolyzed solution. 50 g of Solution (A) of Example 1 were added to 50 g of the hydrolyzed solution, to obtain a liquid coating composition having a solid content of 6% by weight.

Comparative Example 5

A solution that had been prepared by dissolving and mixing 2.7 g of water and 0.6 g of 28% aqueous ammonia as the alkaline catalyst in 25.9 g of ethanol was mixed with a solution prepared by mixing 20.8 g of tetraethoxysilane as the tetraalkoxysilane and 50 g of ethanol, while stirring at room temperature. The mixture was stirred for additional 24 hours still at room temperature to obtain a solution hydrolyzed with the alkaline catalyst, having a solid content of 6% by weight. The particle size of the product could not be measured.

50 g of the hydrolyzed solution and 50 g of Solution (B) of Example 1 were mixed at room temperature to obtain a liquid coating composition having a solid content of 6% by weight.

Comparative Example 6

A solution that had been prepared by dissolving and mixing 5.4 g of water and 1.8 g of 28% aqueous ammonia as the alkaline catalyst in 22 g of ethanol was mixed with a solution prepared by mixing 20.8 g of tetraethoxysilane as the tetraalkoxysilane and 50 g of ethanol, while stirring at room temperature. After 30 minutes, the resulting solution began to show a colloidal color. This was stirred for additional 24 hours still at room temperature to obtain a milky-white solution hydrolyzed with the alkaline catalyst, having a solid content of 6% by weight. The particle size of the particles formed was 120 nm.

50 g of the hydrolyzed solution and 50 g of Solution (B) of Example 1 were mixed at room temperature to obtain a liquid coating composition having a solid content of 6% by weight.

Comparative Example 7

A solution that had been prepared by dissolving and mixing 54 g of water and 0.6 g of 28% aqueous ammonia as the alkaline catalyst in 35 g of ethanol was mixed with a solution prepared by mixing 10.4 g of tetraethoxysilane as the tetraalkoxysilane and 100 g of ethanol, while stirring at room temperature. After 30 minutes, the resulting solution began to show a colloidal color. This was stirred for additional 24 hours still at room temperature to obtain a milky-white solution hydrolyzed with the alkaline catalyst, having a solid content of 3% by weight. The particle size of the particles formed was 180 nm.

50 g of the hydrolyzed solution and 50 g of Solution (B) of Example 1 were mixed at room temperature to obtain a liquid coating composition having a solid content of 4.5% by weight.

Comparative Example 8

A solution that had been prepared by dissolving and mixing 5.4 g of water and 0.03 g of 28% aqueous ammonia as the alkaline catalyst in 23.8 g of ethanol was mixed with a solution prepared by mixing 20.8 g of tetraethoxysilane as the tetraalkoxysilane and 50 g of ethanol, while stirring at room temperature. This was stirred for additional 24 hours still at room temperature to obtain a solution hydrolyzed with the alkaline catalyst, having a solid content of 6% by weight. The particle size of the product could not be measured.

50 g of the hydrolyzed solution and 50 g of Solution (B) of Example 1 were mixed at room temperature to obtain a liquid coating composition having a solid content of 6% by weight.

Film Test Example

Figure 2:
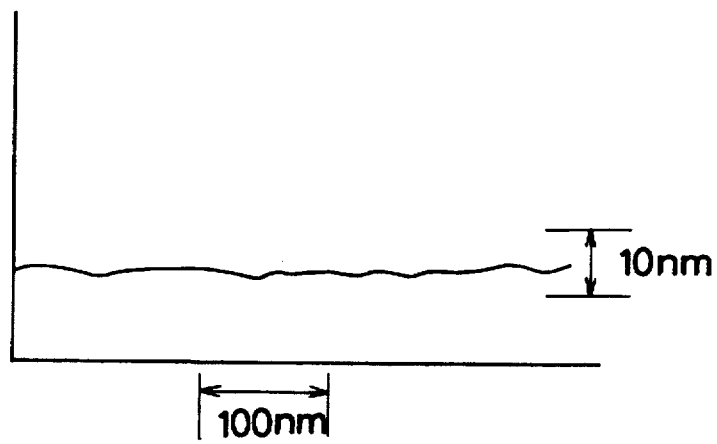
FIG. 2 shows the surface roughness of the film formed from the composition of Comparative Example 1.
Figure 3:
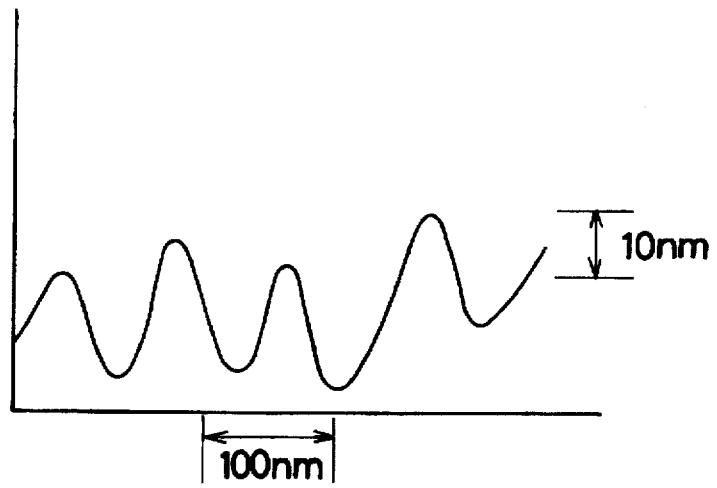
FIG. 3 shows the surface roughness of a non-coated ITO indium tin oxide film.

The liquid coating compositions obtained in the examples and comparative examples each were filtered through a membrane filter having a pore size of 0.482 . An ITO film was formed as a transparent conductive film on the entire surface of a 1.1 mm-thick glass substrate, by spattering. The filtered composition was coated over the ITO film-coated glass substrate, using a spin coater rotating at 4000 rpm for 20 seconds. After the thus-coated substrate was dried on a hot plate at 60° C. for 3 minutes, this was heated in a clean oven at 200° C. for 30 minutes to form a hardened film thereon. The properties of the thus-formed film were measured. The surface roughness of the hardened film formed from the liquid coating composition of Example 1, that of the hardened film formed from the liquid coating composition of Comparative Example 1, and that of the ITC film were measured with an interatomic force scanning tunnel microscope and are shown in FIG. 1, FIG. 2 and FIG. 3, respectively.

A polyimide solution (Sunever SE-150, trade name of Nissan Chemical Industry Co.) was coated over the hardened film by spin coating to form a polyimide film thereon, whereupon the coatability of the polyimide solution was observed. The thus-coated substrate was dried on a hot plate at 80° C. for 3 minutes and then heated in a clean oven at 250° C. for 60 minutes, whereupon the adhesiveness of the oriented polyimide film to the hardened film below it was measured. The films formed on the substrate were tested with respect to the properties indicated in Table 1 below. The test methods employed herein for evaluating the liquid coating compositions and the films formed are mentioned below.

Filterability

Each liquid coating composition was filtered through a 47 mm$\phi$-filter. "x" indicates that the filtered amount was less than 100 ml; "Δ" indicates that the filtered amount was from 100 to 300 ml; and "o" indicates that the filtered amount was more than 300 ml.

Hardness

The surface hardness of the hardened film formed after heating was measured, using a pencil hardness test method of JIS K5400.

Dielectric Constant

An aluminium was plated, as an electrode, on the surface of the hardened film by vapor deposition, and the dielectric constant of the film was measured using LCR, the voltage applied being 1 V and the number of frequency being 1 kHz.

Refractive Index

Each liquid coating composition was coated on a silicon substrate to form a film thereon, and the refractive index of the coated sample was measured using an ellipso meter.

Coatability of Polyimide Solution

A polyimide solution was coated over the hardened film, whereupon the coatability of the solution was observed with the naked eye. "o" indicates that the solution was coated well; "Δ" indicates that the hardened film partly repelled the solution, causing pin holes in the oriented film; and "x" indicates that the solution was not coated well.

Adhesiveness of Oriented Film

The oriented polyimide film formed on the hardened film was peeled from the latter, in accordance with a pencil hardness test method of JIS K5400.

TABLE 1

Results of Tests of Coating Compositions and Coated Films

| Liquid Coating Composition | Filterability | Hardness | Refractive Index | Dielectric Constant | Polyimide Coatability | Adhesiveness of Oriented Film |
|---|---|---|---|---|---|---|
| Example 1  | O | 9H | 1.44 | 4.2 | O | 9H |
| Example 2  | O | 9H | 1.43 | 4.2 | O | 9H |
| Example 3  | Δ | 8H | 1.41 | 4.4 | O | 9H |
| Example 4  | O | 9H | 1.45 | 4.5 | O | 9H |
| Example 5  | O | 8H | 1.42 | 4.1 | O | 9H |
| Example 6  | O | 9H | 1.44 | 4.2 | O | 9H |
| Example 7  | O | 9H | 1.44 | 4.2 | O | 9H |
| Example 8  | O | 9H | 1.46 | 4.7 | O | 9H |
| Example 9  | O | 9H | 1.45 | 4.2 | O | 8H |
| Example 10 | O | 8H | 1.40 | 4.5 | O | 9H |
| Example 11 | O | 9H | 1.42 | 4.2 | O | 9H |
| Example 12 | O | 9H | 1.71 | 13  | O | 9H |
| Comp. Ex. 1 | O | 9H | 1.43 | 4.2 | O | 2H |
| Comp. Ex. 2 | O | 5H | 1.41 | 4.3 | Δ | 8H |
| Comp. Ex. 3 | O | 4H | 1.42 | 4.2 | x | |
| Comp. Ex. 4 | O | 7H | 1.74 | 14  | Δ | 8H |
| Comp. Ex. 5 | Δ | 8H | 1.42 | 4.1 | O | 3H |
| Comp. Ex. 6 | x | 7H | 1.41 | 4.3 | O | 9H |
| Comp. Ex. 7 | O | 9H | 1.43 | 4.1 | O | 3H |
| Comp. Ex. 8 | O | 9H | 1.42 | 4.1 | O | 3H |

Though containing a trialkoxysilane having a high repelling property as the constitutive component, the liquid coating composition of the present invention may form an insulating film having high mechanical strength on a substrate and the coatability of a polyimide solution over the film is good.

When the film is used as an insulating film for a liquid crystal display element, its insulation property is good and it does not have any bad influence on the display performance of the element. Hence, the composition of the present invention is useful for forming an insulating film for liquid crystal display elements.

While the invention has been described in detail and with reference to specific embodiments thereof, it will be apparent to one skilled in the art that various changes and modifications can be made therein without departing from the spirit and scope thereof.

What is claimed is:

1. A liquid coating composition for the formation of a liquid crystal display element insulating film, which comprises:

(a) a solution obtained by hydrolyzing a tetraalkoxysilane of the general formula (1):

$$Si(OR)_4 \tag{1}$$

wherein R represents an alkyl group having from 1 to 5 carbon atoms, in an organic solvent in the presence of an alkaline catalyst, said solution containing particles having a particle size of from 10 nm to 80 nm;

(b) at least one member selected from the group consisting of:

(i) a hydrolyzed product, formed in the presence of an acid catalyst, of an alkoxysilane of the general formula (2):

$$R^1{}_n Si(OR^2)_{4-n} \tag{2}$$

wherein $R^1$ represents a group having 1 to 18 carbon atoms, said group being an alkyl group, an alkenyl group or an aryl group, $R^2$ represents an alkyl group having from 1 to 5 carbon atoms, and n represents an integer of from 0 to 2, and (ii) a hydrolyzed product, formed in the presence of an acid catalyst, of a tetraalkoxy titanium of the general formula (3):

$$Ti(OR^3)_4 \tag{3}$$

wherein $R^3$ represents an alkyl group having from 1 to 5 carbon atoms;

(c) an aluminum salt; and (d) a deposition inhibitor, all having been uniformly mixed in an organic solvent.

2. A liquid coating composition for the formation of a liquid crystal display element insulating film according to claim 1, in which the molar content of the aluminium salt is from 0.05 to 1.0 times the mole of the sum of the alkoxide compounds of a tetraalkoxysilane of the general formula (1):

$$Si(OR)_4 \tag{1}$$

wherein R represents an alkyl group having from 1 to 5 carbon atoms; an alkoxysilane of the general formula (2):

$$R^1{}_n Si(OR^2)_{4-n} \tag{2}$$

wherein $R^1$ represents an alkyl group, an alkenyl group or an aryl group, $R^2$ represents an alkyl group having from 1 to 5 carbon atoms, and n represents an integer of from 0 to 2;

and a tetraalkoxy titanium of the general formula (3):

$$Ti(OR^3)_4 \tag{3}$$

wherein $R^3$ represents an alkyl group having from 1 to 5 carbon atoms.

3. A liquid coating composition for the formation of a liquid crystal display element insulating film according to claim 1, in which the content of the deposition inhibitor is one time or more the weight of the aluminium salt in terms of $Al_2O_3$.

4. A liquid coating composition for the formation of a liquid crystal display element insulating film according to claim 1, in which the deposition inhibitor is selected from the group consisting of ethylene glycol, N-methylpyrrolidone, dimethylformamide, and dimethylacetamide.

5. A liquid coating composition according to claim 1, wherein the alkaline catalyst is selected from the group consisting of ammonia and amines.

6. A liquid coating composition according to claim 1, wherein the alkaline catalyst is employed in an amount of 1 to 20 mol % relative to the tetraalkoxysilane of the general formula (1).

7. A liquid coating composition according to claim 1, said composition comprising said hydrolyzed product of an alkoxysilane of the general formula (2).

8. A liquid coating composition for the formation of a liquid crystal display element insulating film, which comprises:

(a) a solution obtained by hydrolyzing a tetraalkoxysilane of the general formula (1):

$$Si(OR)_4 \qquad (1)$$

wherein R represents an alkyl group having from 1 to 5 carbon atoms,
in an organic solvent in the presence of an alkaline catalyst;

(b) a hydrolyzed product, formed in the presence of an acid catalyst, of an alkoxysilane of the general formula (2):

$$R^1{}_nSi(OR^2)_{4-n} \qquad (2)$$

wherein $R^1$ represents a group having 1 to 18 carbon atoms, said group being an alkyl group, an alkenyl group or an aryl group, $R^2$ represents an alkyl group having from 1 to 5 carbon atoms, and n represents an integer of 1 or 2;

(c) an aluminum salt; and (d) a deposition inhibitor, all having been uniformly mixed in an organic solvent.

9. A liquid coating composition for the formation of a liquid crystal display element insulating film, which comprises:

(a) a solution obtained by hydrolyzing a tetraalkoxysilane of the general formula (1):

$$Si(OR)_4 \qquad (1)$$

wherein R represents an alkyl group having from 1 to 5 carbon atoms,
in an organic solvent in the presence of an alkaline catalyst;

(b) a hydrolyzed product, formed in the presence of an acid catalyst, of an alkoxysilane of the general formula (2):

$$R^1{}_nSi(OR^2)_{4-n} \qquad (2)$$

wherein $R^1$ represents a group having 1 to 18 carbon atoms, said group being an alkyl group, an alkenyl group or an aryl group, $R^2$ represents an alkyl group having from 1 to 5 carbon atoms, and n represents an integer of from 0 to 2;

(c) a hydrolyzed product of a tetraalkoxy titanium of the general formula (3):

$$Ti(OR^3)_4 \qquad (3)$$

wherein $R^3$ represents an alkyl group having from 1 to 5 carbon atoms;

(d) an aluminum salt; and (e) a deposition inhibitor, all having been uniformly mixed in an organic solvent.

10. A liquid coating composition according claim 8, wherein said solution obtained by hydrolyzing a tetraalkoxysilane of the general formula (1) contains particles having a particle size of from 10 nm to 80 nm.

11. A liquid coating composition according to claim 8, wherein the alkaline catalyst is selected from the group consisting of ammonia and amines.

12. A liquid coating composition according to claim 8, wherein the alkaline catalyst is employed in an amount of 1 to 20 mol % relative to the tetraalkoxysilane of the general formula (1).

13. A liquid coating composition according to claim 8, wherein the deposition inhibitor is selected from the group consisting of ethylene glycol, N-methylpyrrolidone, dimethylformamide, and dimethylacetamide.

* * * * *